(12) United States Patent
Hanada et al.

(10) Patent No.: US 7,894,158 B2
(45) Date of Patent: Feb. 22, 2011

(54) MAGNETIC DISK APPARATUS

(75) Inventors: Kazuyoshi Hanada, Kanagawa (JP);
Masaru Muranishi, Kanagawa (JP);
Takashi Matsuki, Kanagawa-ken (JP);
Yuuji Ishima, Kanagawa (JP)

(73) Assignee: Hitachi Global Technologies Netherlands B.V., Amsterdam (NL)

( * ) Notice: Subject to any disclaimer, the term of this patent is extended or adjusted under 35 U.S.C. 154(b) by 801 days.

(21) Appl. No.: 11/801,502

(22) Filed: May 9, 2007

(65) Prior Publication Data

US 2007/0263320 A1 Nov. 15, 2007

(30) Foreign Application Priority Data

May 9, 2006 (JP) .............................. 2006-130852

(51) Int. Cl.
G11B 19/20 (2006.01)
H02K 1/16 (2006.01)
H02K 3/52 (2006.01)

(52) U.S. Cl. .................. 360/99.08; 360/98.07; 310/179

(58) Field of Classification Search .............. 360/98.07, 360/99.04, 99.08; 310/67 R, 179, 254.1
See application file for complete search history.

(56) References Cited

U.S. PATENT DOCUMENTS 5,432,644 A * 7/1995 Tajima et al. ............ 360/99.04
6,982,513 B2 1/2006 Fujii et al.
2002/0089246 A1 7/2002 Wauke
2003/0031113 A1 2/2003 Asano
2004/0252404 A1 12/2004 De Leo et al.

FOREIGN PATENT DOCUMENTS

| JP | 63191387 A | * | 8/1988 |
| JP | 05062447 A | * | 3/1993 |
| JP | 05189932 A | * | 7/1993 |
| JP | 06052624 A | * | 2/1994 |
| JP | 11-110896 | | 4/1999 |
| JP | 2001-076417 | | 3/2001 |
| JP | 2001076417 A | * | 3/2001 |
| JP | 2002-262486 | | 9/2002 |

* cited by examiner

*Primary Examiner*—William J Klimowicz
(74) *Attorney, Agent, or Firm*—Mahamedi Paradice Kreisman LLP; Christopher J. Brokaw

(57) ABSTRACT

An embodiment of a magnetic disk apparatus in accordance with the present invention includes a magnetic recording medium, a magnetic head assembly having a magnetic head which reads and writes data on the magnetic recording medium, and a motor coil assembly rotationally driving a spindle motor rotation body, in which plural motor coils are arranged on a circumference around the rotation center of the spindle motor rotation body so that intervals in the circumferential direction are equal, in a stator base surrounding a periphery of the spindle motor rotation body and having a shape in which a prescribed moving locus portion of at least the magnetic head assembly is cut out.

1 Claim, 4 Drawing Sheets

PRIOR ART

TO HOST

MAGNETIC DISK APPARATUS

CROSS-REFERENCE TO RELATED APPLICATION

The instant nonprovisional patent application claims priority to Japanese Application No. 2006-130852 filed May 9, 2006 and incorporated by reference in its entirety herein for all purposes.

BACKGROUND OF THE INVENTION

In recent years, magnetic disk apparatuses such as a hard disk, are required not only to be improved in recording density and recording capacity, but also to be smaller and thinner.

A commonly-used hard disk includes, as shown in FIG. 4, a magnetic disk medium 1, a spindle motor 2, a magnetic head assembly 3, a voice coil motor 4, and a circuit component 5.

According to a cross-sectional view at the surface including the rotation center of the magnetic disk medium 1 shown in FIG. 5, the spindle motor 2 includes a motor hub 21, permanent magnets 22 arranged along the circumference at the outer periphery side in the motor hub, motor coils 24 formed by wires wound therearound on a stator base 23, and a magnetic shield 25 for preventing a magnetic field generated in the spindle motor 2 from affecting magnetic signals recorded in the magnetic disk medium 1.

The motor hub 21 supports the magnetic disk medium 1. When rotating the spindle motor 2, the motor hub 21 including the permanent magnets 22 therein, is excited by using respective motor coils 24 and rotationally driven. In the shown example, the spindle motor 2 is driven by a three phase alternating current, therefore, multiples of "3" (in this case, 9) motor coils 24 are provided.

In the spindle motor 2, the motor coils are arranged on the circumference at almost equal intervals as further shown by a plan view thereof in FIG. 6.

On the other hand, the magnetic head assembly 3 pivotally moves about the rotation center at an angle of a prescribed range by the voice coil motor 4. At this time, when moving the head to a track of the most-inner circumference in the magnetic disk medium 1, the head will be moved to a gap between the magnetic disk medium 1 and the stator base 23 (gap denoted by "D" in FIG. 5).

The circuit component 5 is connected to a host such as a personal computer. The circuit component 5 rotationally drives the spindle motor 2, and rotationally drives the voice coil motor 4 so as to move the head to a track which is an access target in tracks formed on the magnetic disk medium 1 in accordance with an instruction of access inputted from the host side. The circuit component 5 also outputs data to the host, which is demodulated from a signal read out from the magnetic disk medium 1 by the head installed in the magnetic head assembly 3. Further, when receiving input of data to be recorded from the host, the circuit component 5 outputs a signal relating to the data to the head installed in the magnetic head assembly 3, and records the data on the magnetic disk medium 1.

As described above in reference to FIGS. 4 and 5, the head for reading or writing information is transported on the magnetic disk medium 1, therefore, it is necessary to install a member (motor coil assembly) including the motor coil assembly stator base 23 at the position apart from the surface of the magnetic disk medium 1, in consideration of the thickness of the head.

Therefore, even when the apparatus is intended to be thinner, it is difficult to narrow the gap ("D" in FIG. 5). When the gap is narrowed in order to make the apparatus thinner, a portion relating to the circumference of the stator base 23 is not used in the inner circumference side of the magnetic disk medium 1, or the mounting volume of the motor coils 24 is made to be small.

However, when the inner circumference side in the magnetic disk medium 1 is not used, recording capacity will be reduced. When the mounting volume of the motor coils 24 becomes small, driving ability will be reduced and starting time of the spindle motor will be long.

In Japanese Laid-Open Patent No. 11-110896 ("Patent Document 1"), a technique is disclosed in which the stator coil has a shape of axis asymmetry having a notch which is larger than a range interfering with a moving range of the magnetic head to prevent the interference between the magnetic head and the stator coil.

BRIEF SUMMARY OF THE INVENTION

Embodiments in accordance with the present invention provide a magnetic disk apparatus which allows the apparatus to be thinner while preventing the lowering of recording capacity or the prolongation of starting time of the spindle motor. According to the particular embodiment disclosed in FIG. 1 of the present invention, a magnetic disk apparatus includes a magnetic recording medium 1, a magnetic head assembly 3 having a magnetic head which reads and writes data on the magnetic recording medium 1, and a motor coil assembly rotationally driving a spindle motor rotation body, in which plural motor coils are arranged on a circumference around the rotation center of the spindle motor rotation body so that intervals in the circumferential direction are equal in a stator base surrounding a periphery of the spindle motor rotation body and having a shape in which a prescribed moving locus portion of at least the magnetic head assembly is cut out.

DETAILED DESCRIPTION OF THE INVENTION

Embodiments in accordance with the present invention relate to a magnetic disk apparatus such as a hard disk.

Embodiments of the present invention have been made to provide a magnetic disk apparatus which allows the apparatus to be thinner while preventing the lowering of recording capacity or the prolongation of starting time of the spindle motor.

In order to solve the above conventional problems, embodiments of the present invention disclose a magnetic disk apparatus which includes a magnetic recording medium, a magnetic head assembly having a magnetic head which records information in a target track as an access target, or reads out information from the target track in tracks formed on the magnetic recording medium, which moves on a prescribed moving locus to transport the magnetic head to the target truck, a spindle motor rotation body fixed to the magnetic recording medium, and a motor coil assembly rotationally driving the spindle motor rotation body, in which plural motor coils are arranged on a circumference around the rotation center of the spindle motor rotation body so that intervals in the circumferential direction are equal, in a stator base surrounding a periphery of the spindle motor rotation body and having a shape in which a prescribed moving locus portion of at least the magnetic head assembly is cut out.

Figure 1:
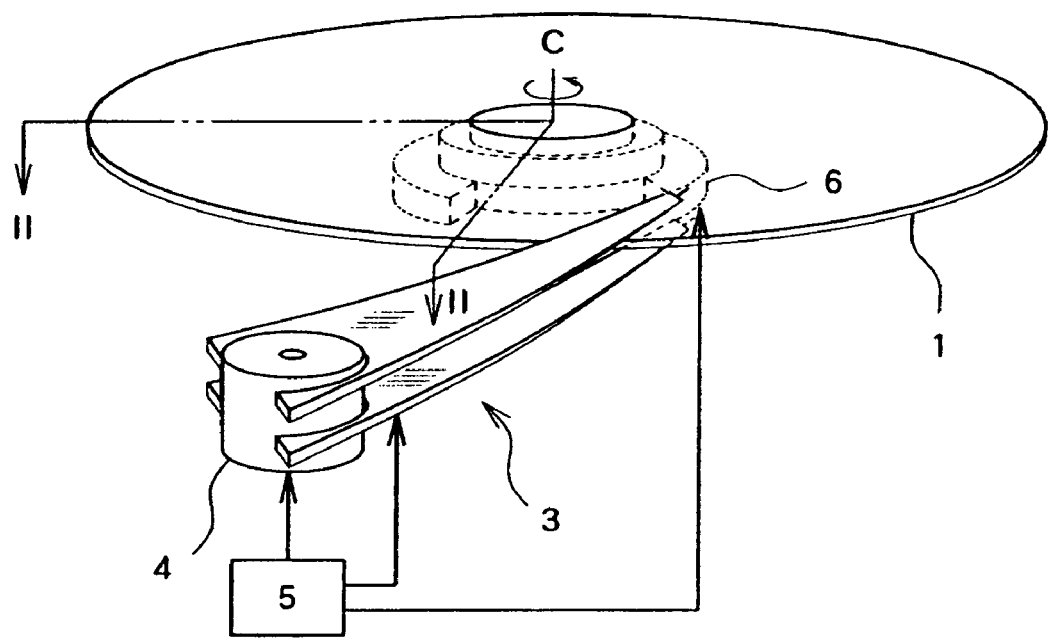
FIG. 1 is a schematic view showing a configuration of a magnetic disk apparatus according to an embodiment of the invention.

An embodiment of the invention will be explained with reference to the drawings. A magnet disk apparatus of the invention includes a magnetic disk medium 1, a spindle motor 6, a magnetic head assembly 3, a voice coil motor 4, and a circuit component 5, as shown in FIG. 1.

The magnetic medium 1 is made by forming a magnetic film on a base material using, for example, glass or aluminum, recording and storing information by magnetic signals. The magnetic head assembly 3 is rotationally driven by the voice coil motor 4, and pivotally moves on the rotation center in a range of a prescribed angle (moving range).

The circuit component 5 is connected to a host such as a personal computer. The circuit component 5 rotationally drives the spindle motor 6, and rotationally drives the voice coil motor 4 so as to move the head to a track which is an access target in tracks formed on the magnetic disk medium 1 in accordance with an instruction of access inputted from the host side. The circuit component 5 also outputs data to the host, which is demodulated from a signal read out from the magnetic disk medium 1 by the head installed in the magnetic head assembly 3. Further, when receiving input of data to be recorded from the host, the circuit component 5 outputs a signal relating to the data to the head installed in the magnetic head assembly 3 and records the data on the magnetic disk medium 1.

Figure 2:
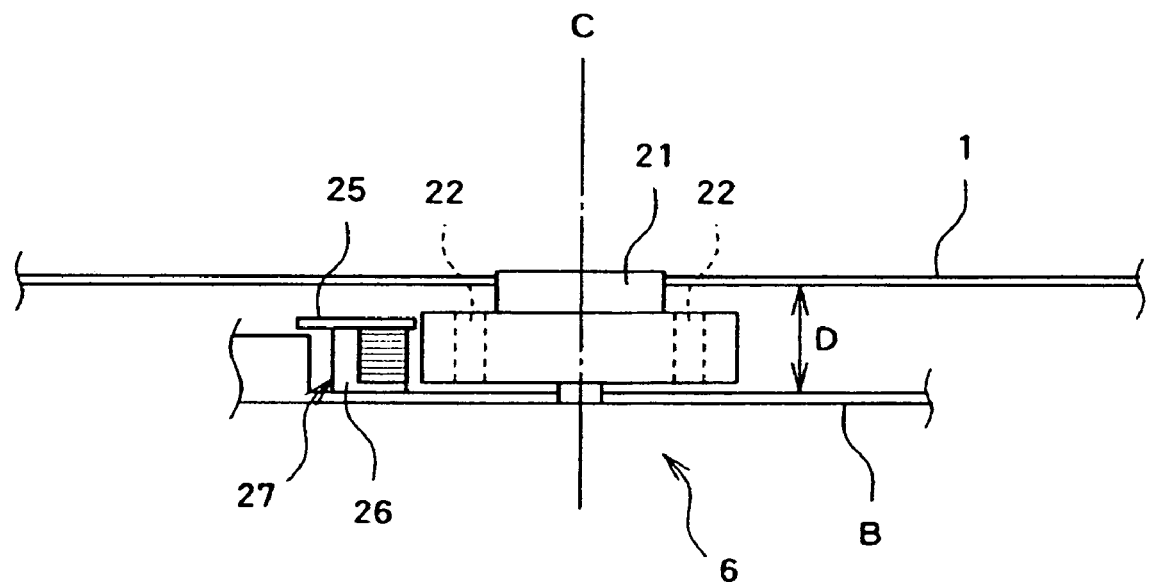
FIG. 2 is a cross-sectional view showing a spindle motor of the magnetic disk apparatus according to the embodiment of the invention.
Figure 3:
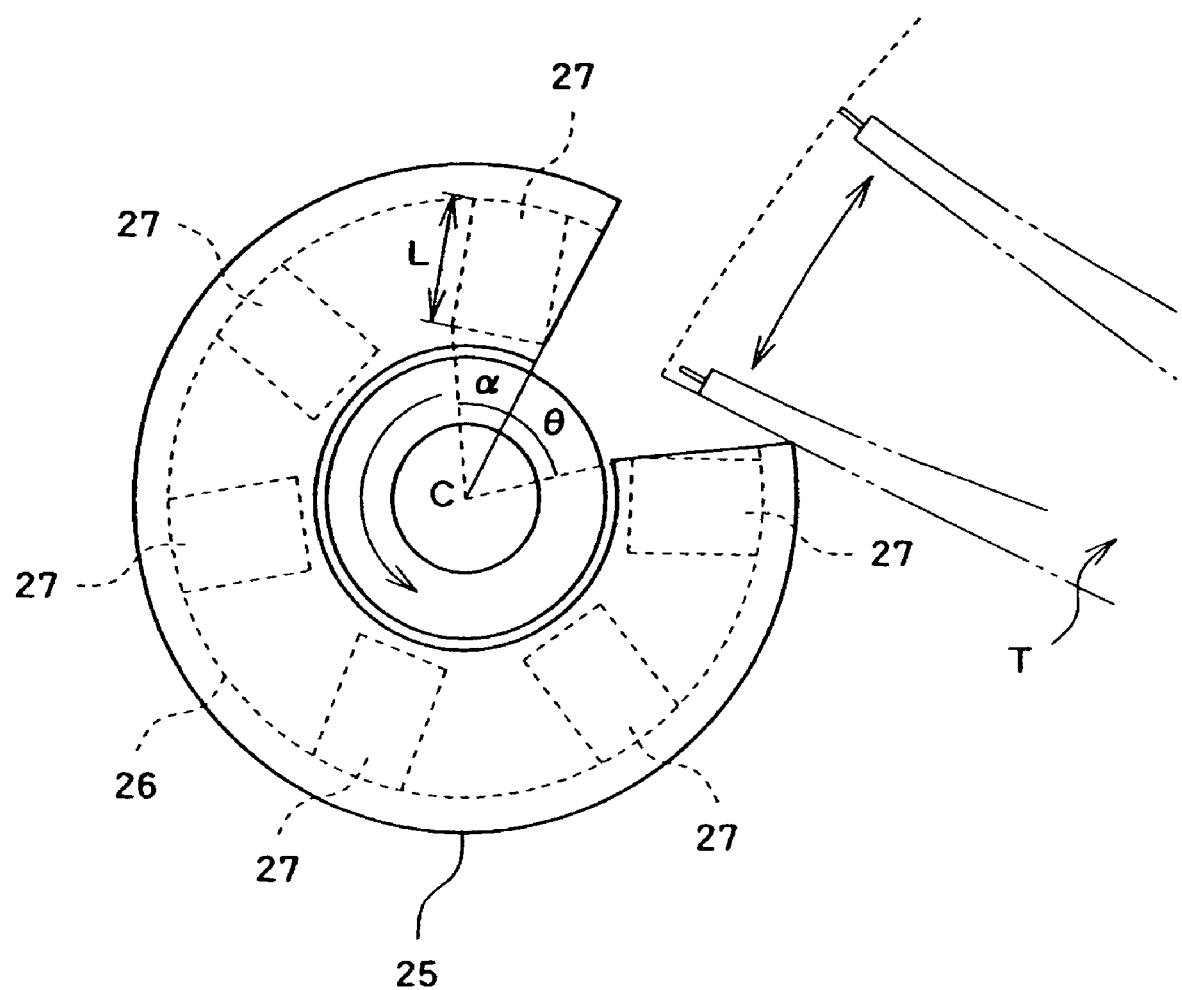
FIG. 3 is a plan view showing the spindle motor of the magnetic disk apparatus according to the embodiment of the invention.
Figure 4:
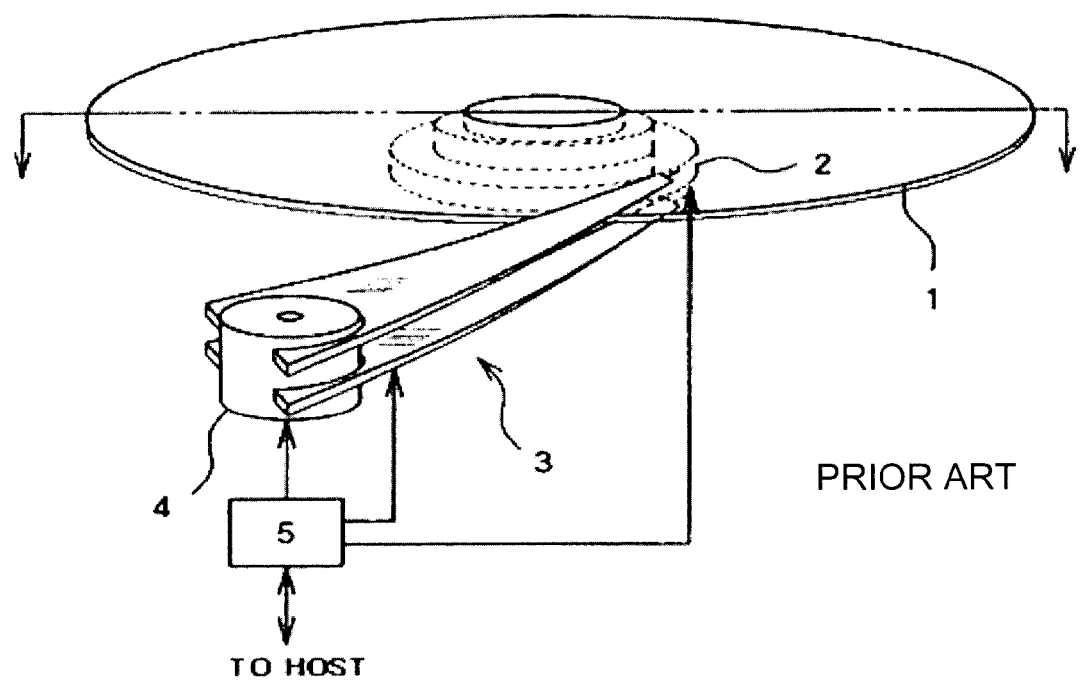
FIG. 4 is a schematic view showing a configuration of a commonly-used magnetic disk apparatus.
Figure 5:
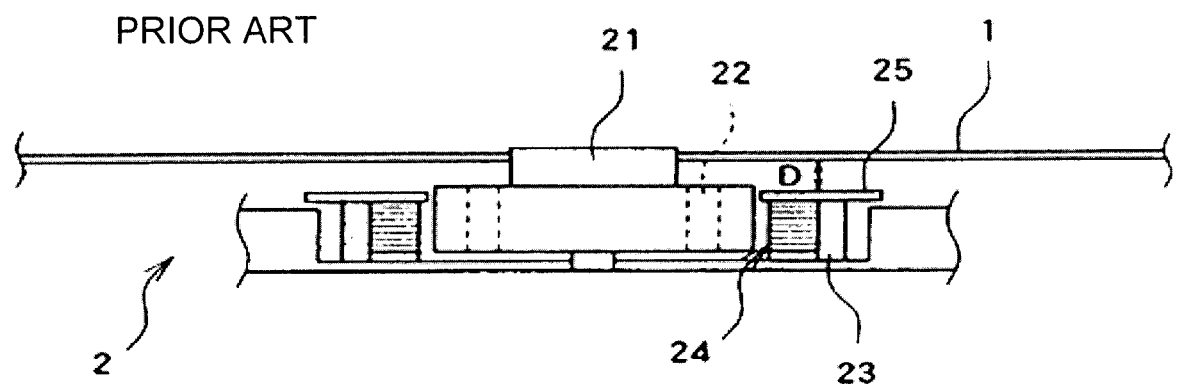
FIG. 5 is a cross-sectional view showing a spindle motor of the commonly-used magnetic disk apparatus.
Figure 6:
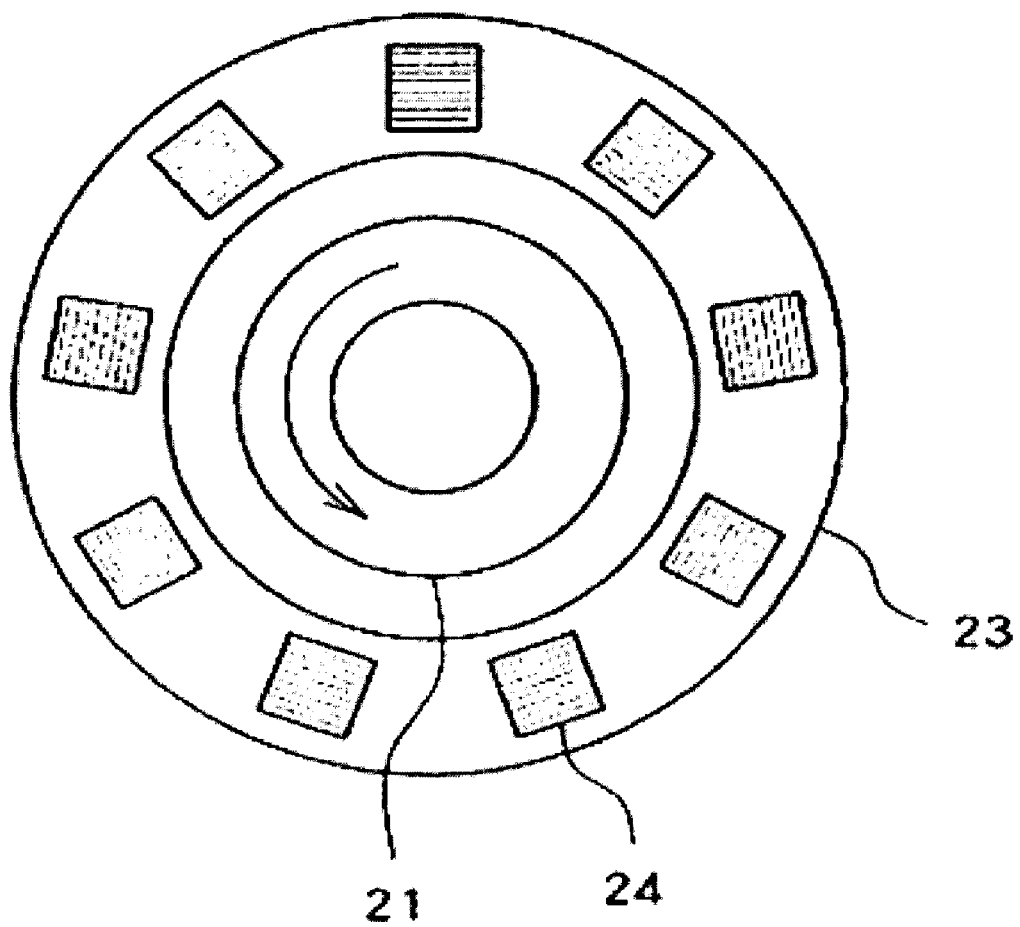
FIG. 6 is a plan view showing the spindle motor of the commonly-used magnetic disk apparatus.

The spindle motor 6 in the embodiment is driven by a three phase alternation current. Therefore, multiples of "3" pieces of motor coils are necessary in the spindle motor 6. As shown in FIG. 2 and FIG. 3 by a cross-sectional view and a plan view, the spindle motor 6 includes a motor hub 21, permanent magnets 22 arranged along the circumference at the outer periphery side in the motor hub, motor coils 27 formed by wires wound therearound on a stator base 26 surrounding the periphery of the motor hub 21, and a magnetic shield 25 for preventing a magnetic field generated in the spindle motor 2 from affecting magnetic signals recorded in the magnetic disk medium 1.

The motor hub 21 is made of, for example, stainless steel, aluminum, or iron, and the magnetic disk medium 1 is fixed to the motor hub 21. The motor hub 21 corresponds to a spindle motor rotation body according to embodiments of the present invention, and the stator base 26 and the motor coils 27 correspond to a motor coil assembly according to embodiment of the present invention. In the embodiment, the stator base 26 in the motor coil assembly has a shape in which a moving locus portion (T) is cut out, which is prescribed at least in a moving range of the magnetic head assembly 3 as shown in FIG. 3. Accordingly, the magnetic head and an arm supporting the magnetic head do not interfere with the spindle motor 6, and the magnetic head gets into a gap (gap "D" in FIG. 2) between the magnetic disk medium 1 and a base "B" supporting the spindle motor 6.

Therefore, even when the gap between the motor coils and the magnetic disk medium 1 is narrowed, it becomes possible to move the head to the inner circumference side of the magnetic disk medium 1.

Plural pieces of motor coils 27 provided on the stator base 26 are arranged on a circumference around the rotation center of the spindle motor rotation body so that intervals in the circumferential direction become substantially equal. Since the spindle motor 6 is rotationally driven in three phase alternating current, the number of motor coils 27 is multiples of "3", for example, 6 pieces.

Specifically, in the embodiment, it is preferable that the range to be cut out in the stator base 26 is within a range corresponding to a sector portion having a central angle θ, which has the rotation center "C" as shown in FIG. 3. Consequently, an arrangement interval φ of the motor coils 27 will be an angle determined so as not to be φ<(θ+α) when an angle corresponding to the width of each motor coil 27 in the circumferential direction calculated from the rotation center θ is α.

For example, when a portion corresponding to the center angle θ=50 degrees is cut out and α=10 degrees, φ will be 60 degrees or more. In this case, the motor coils 27 are arranged at every 60 degrees, 6 pieces of motor coils which are multiples of "3" can be arranged.

As described above, according to the embodiment, it is possible to allow the apparatus to be thinner while preventing the lowering of recording capacity or the prolongation of the starting time of the spindle motor. Furthermore, according to the embodiment, though a part of the stator base 26 is cut out, the motor coils are arranged at almost equal intervals, therefore, efficiency of rotational drive of the spindle motor 6 can be maintained as well as the rotation can be made stable.

In the example, the case in which the magnetic disk medium 1 is a single has been described with reference to the drawings, however, it is preferable that there are plural magnetic disk media 1, and in that case, heads which respectively correspond to both faces of respective magnetic disk media 1 are provided on the magnetic head assembly 3. Further, between respective magnetic disk media 1, disk spacers are interposed to keep the gap fixed.

In the embodiment, in the case that the thickness of the stator base 26 decreases by making the apparatus thin, rotation ability of the spindle motor 6 can be maintained by elongating the length of the motor coil in the radius direction ("L" in FIG. 3) and increasing the number of turns of winding. At this time, space encroached by elongation of the motor coil in the radius direction is the space originally intended for being set apart by the gap "D" for the head corresponding to the magnetic disk medium 1 positioned in the lowest layer. Therefore, there is no effect on the mounting of other components.

What is claimed is:

1. A magnetic disk apparatus, comprising:
   a magnetic recording medium;
   a magnetic head assembly having a magnetic head which records information in a target track as an access target, or reads out information from the target track in tracks formed on the magnetic recording medium, which moves on a prescribed moving locus to transport the magnetic head to the target track;
   a spindle motor rotation body fixed to the magnetic recording medium;
   a motor coil assembly rotationally driving the spindle motor rotation body, in which plural motor coils are arranged on a circumference around the rotation center of the spindle motor rotation body so that all intervals in the circumferential direction are substantially equal; and a stator base surrounding a periphery of the spindle motor rotation body, wherein a shape of the stator base comprises a cut out portion, wherein the cut out portion enables a prescribed moving locus portion of the magnetic head assembly to move to an inner circumference side of the magnetic recording medium, wherein an arrangement internal for the plural motor coils is equal to or greater than a sum of (a) a central angle of the cut out portion and (b) a central angle corresponding to a width of each motor coil of the plural motor coils, and wherein the number of plural motor coils is a multiple of three.

* * * * *